Jan. 24, 1956  D. T. AYERS, JR  2,731,797
BOOSTER BRAKE MECHANISM
Filed March 8, 1954  5 Sheets-Sheet 1

INVENTOR.
DAVID T. AYERS JR
BY John F. Phillips
ATTORNEY

Jan. 24, 1956 D. T. AYERS, JR 2,731,797
BOOSTER BRAKE MECHANISM
Filed March 8, 1954 5 Sheets-Sheet 2

INVENTOR.
DAVID T. AYERS JR.
BY John F. Phillips
ATTORNEY

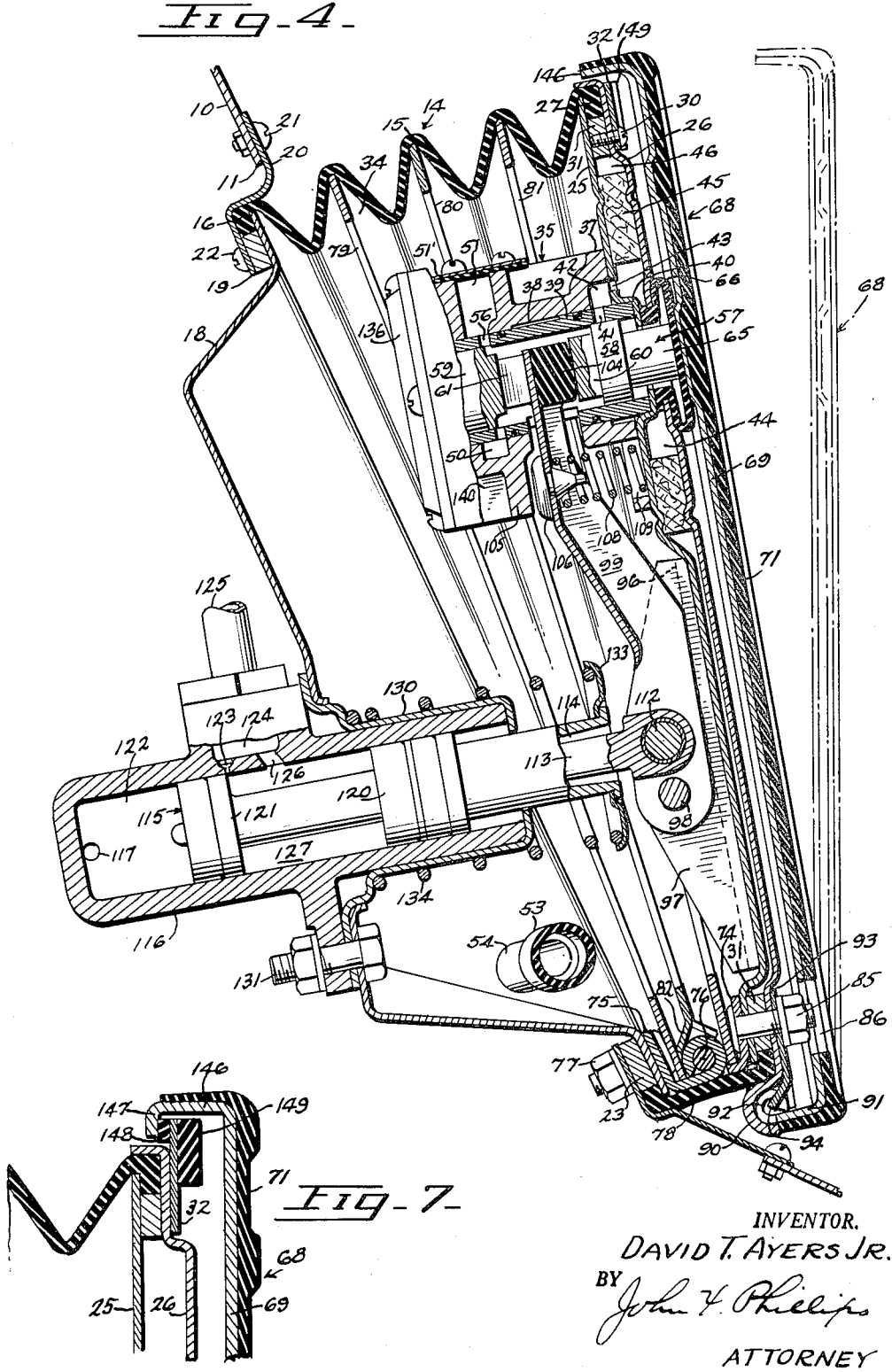

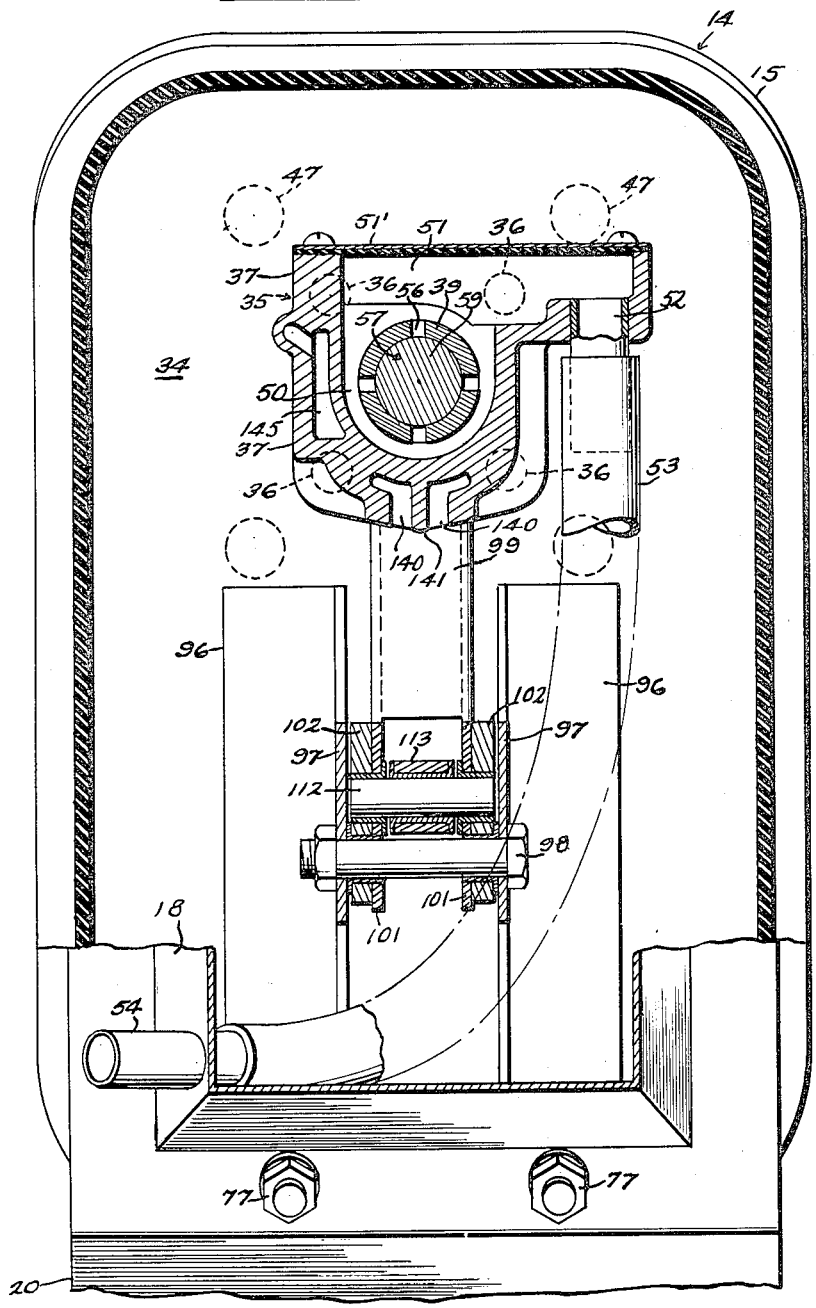

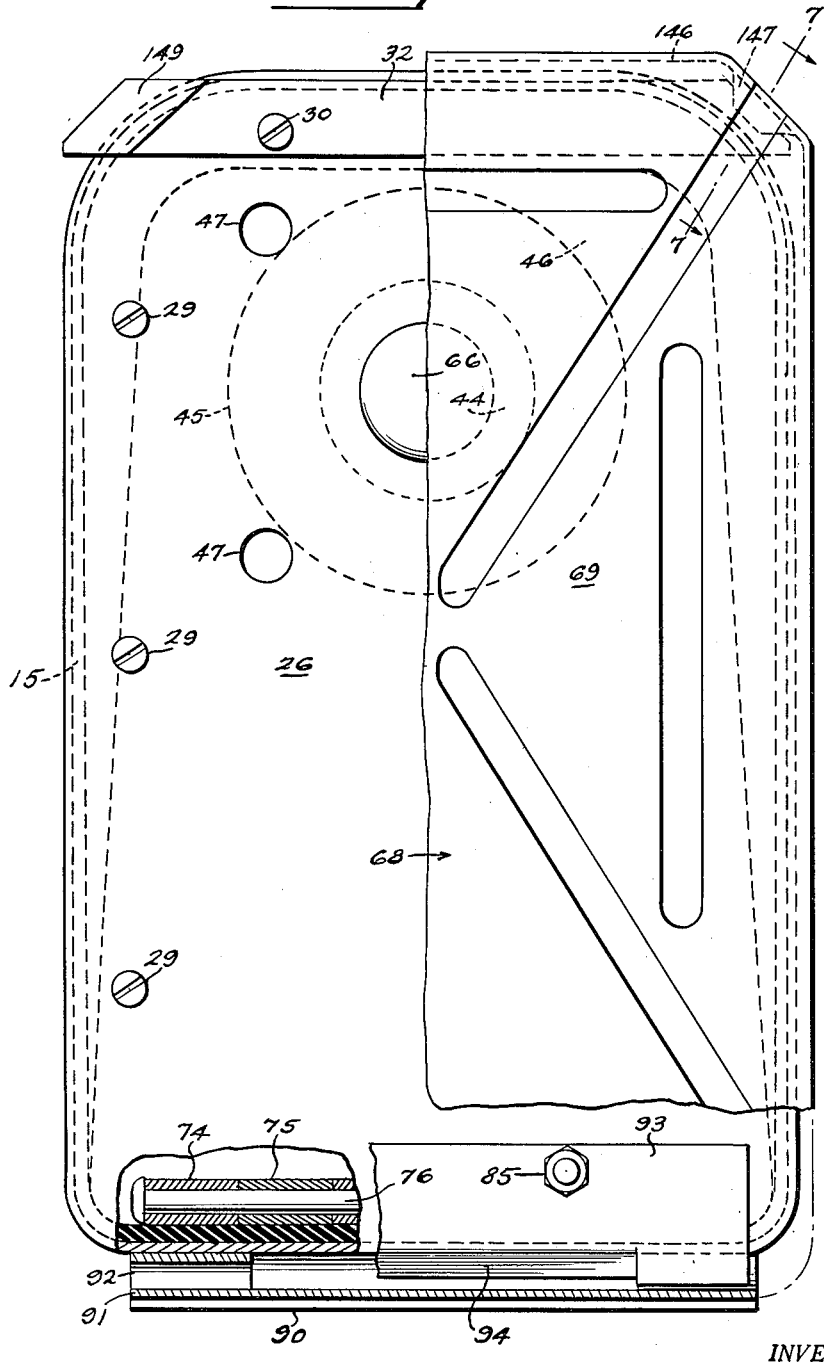

United States Patent Office 2,731,797
Patented Jan. 24, 1956

2,731,797

BOOSTER BRAKE MECHANISM

David T. Ayers, Jr., Birmingham, Mich., assignor to Kelsey-Hayes Wheel Company, Detroit, Mich., a corporation of Delaware Application March 8, 1954, Serial No. 414,840

18 Claims. (Cl. 60—54.6)

This invention relates to a booster brake mechanism and is an improvement over the construction shown in the copending application of Edward Govan Hill and David T. Ayers, Jr., Serial No. 347,700, filed April 9, 1953.

In the copending application referred to, there is disclosed a highly desirable general type of booster mechanism for motor vehicle brakes. Such prior construction employs a bellows type motor arranged to be secured over the toe board of a motor vehicle and provided with a treadle plate, preferably coextensive with the adjacent wall of the motor, and having limited free rocking movement relative thereto. This free movement is utilized for operating the valve mechanism for controlling energization of the fluid pressure operated booster motor.

Such type of booster mechanism is highly advantageous for several reasons. For example, it requires a minimum amount of space for installation on a motor vehicle; it is economical to manufacture and easy to install. The characteristics of the mechanism are such that the entire booster mechanism can be made as a unit or "package," and it readily may be installed in position against the toe board of the vehicle with respect to a pre-formed opening therein. The unit is entirely self-contained and requires merely the connection of one end of a fluid line to the master cylinder forming a part of the unit. Inasmuch as most of the mechanism is arranged rearwardly of the toe board of the vehicle, great economy in space is effected, and this is highly important in view of the limited space available for booster brake mechanisms forwardly of the toe board.

In the copending application referred to, several types of means are employed for reacting against the treadle plate to provide the latter with "feel." For example, the copending application discloses means for directly or indirectly utilizing hydraulic pressures developed in the master cylinder for opposing movement of the treadle plate after motor energization has taken place, the reaction providing the brake pedal with "feel" in accordance with pressures developed in the master cylinder. In another type of the prior device, means responsive to the degree of energization of the motor is employed for reacting against the treadle.

While the prior constructions shown in the copending application referred to are highly desirable from a number of standpoints as indicated, they do not provide reactions of the type found very desirable particularly on passenger vehicles. For example, where hydraulic reactions in accordance with master cylinder pressures are utilized, movement of the follow-up valve from normal off position takes place against the tension of relatively light spring means, and upon energization of the motor, the operating treadle tends to fall away from the operator's foot, followed by the build-up of hydraulic reaction feel too rapidly for a smooth pedal operation. This is not so true of the type of device which provides treadle reaction in accordance with motor energization. However, in such type of device, the pedal resistance does not progressively increase as smoothly as desired and hydraulic reaction occurs later in the operation of the device but not until the follow-up valve has been moved to its limit of movement away from the normal off position.

An important object of the present invention is to provide a bellows type booster brake mechanism wherein all of the practical advantages of the structures of the prior application are retained but wherein "feel" reactions against the treadle are greatly improved and smoothed out in the progressive application of the reactions to the treadle.

More specifically, an object of the invention is to provide novel combined reaction means for the treadle responsive both to the degree of energization of the motor and to hydraulic pressures in the master cylinder and to utilized the latter pressures automatically at a predetermined point without regard to movement of the follow-up valve to its limit of movement.

A further object is to provide such a construction wherein the reaction means responsive to booster motor pressures provide progressive resistance to movement of the treadle when the latter is actuated, thus preventing the feeling that the treadle is dropping away from the operator's foot, and to provide in conjunction therewith a novel type of means for operating the master cylinder piston and for reacting against the follow-up valve in accordance with master cylinder pressures, these pressures becoming effective at a predetermined point, rather than by utilizing such pressures after the follow-up valve has moved to its limit of movement.

A further object is to provide such a mechanism wherein, after full motor energization has taken place, the means for transmitting master cylinder pressures to the follow-up valve is moved by the latter back to a normal position for transmitting pedal pressures directly to the master cylinder piston to supplement the power of the booster motor.

Other objects and advantages of the invention will become apparent during the course of the following description.

In the drawings I have shown one embodiment of the invention. In this showing:

Figure 4 is a view similar to Figure 2 showing all of the parts in intermediate motor-energized positions;

Figure 5 is a vertical sectional view taken substantially on line 5—5 of Figure 1;

Figure 6 is a face view showing the treadle plate without the rubber covering thereon, parts being broken away and parts being shown in section; and Figure 7 is a fragmentary sectional view on line 7—7 of Figure 6.

Figure 1:
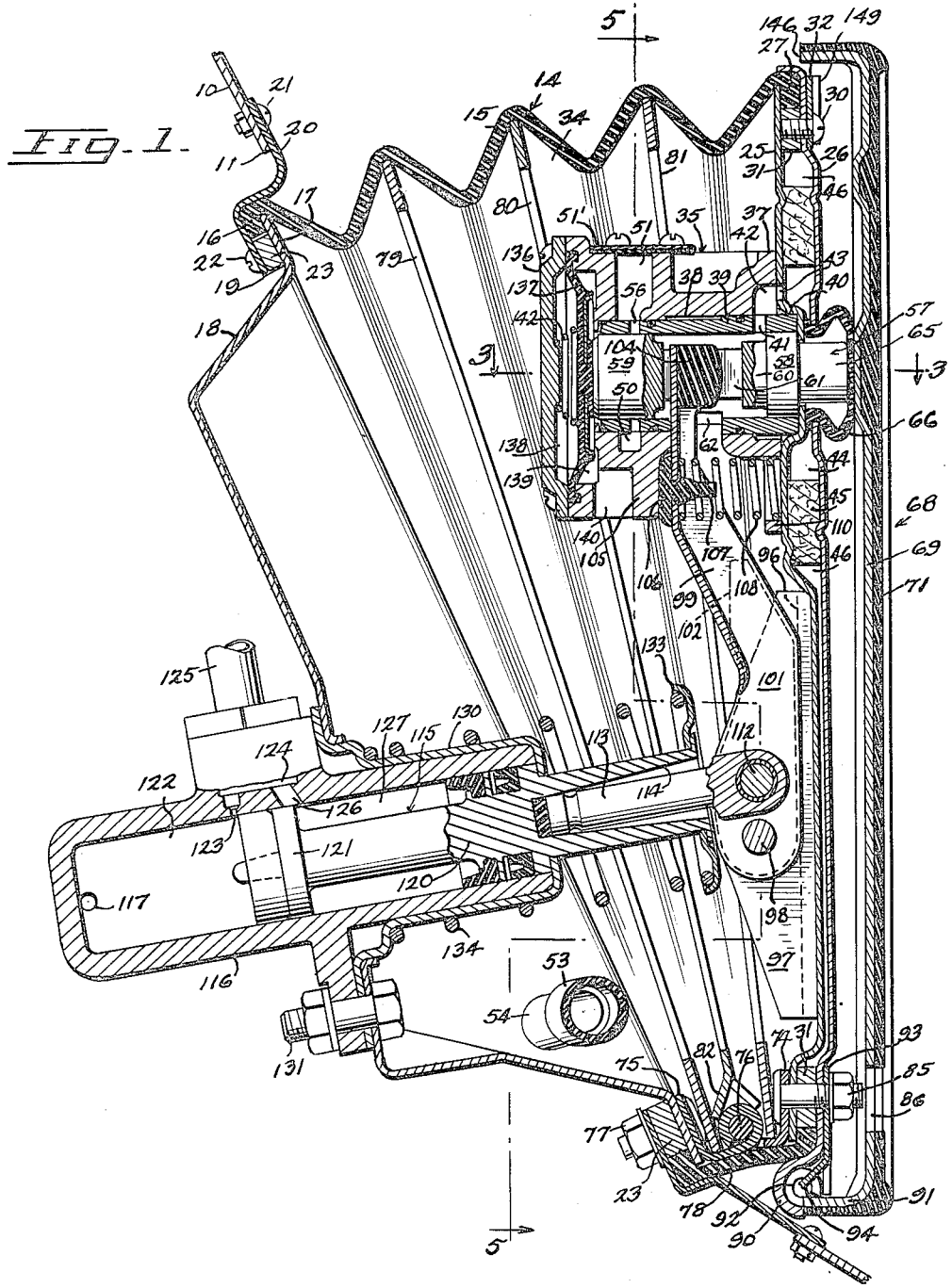
Figure 1 is a central vertical sectional view through the booster mechanism, parts being broken away and parts being shown in elevation, with all of the elements of the mechanism shown in their normal off positions.
Figure 2:
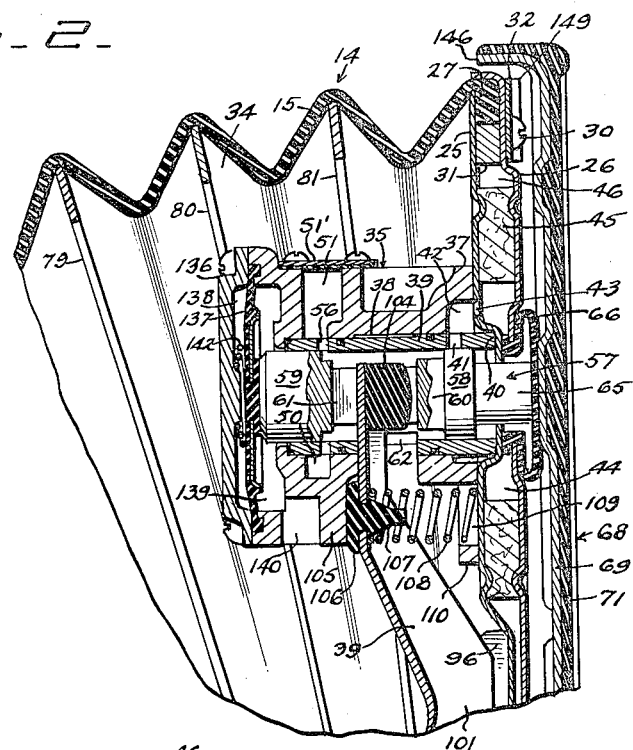
Figure 2 is a fragmentary sectional view, similar to Figure 1, showing the valve mechanism and associated parts with the follow-up valve moved to an initial motor-energizing position.

Referring to Figures 1 and 2, the numeral 10 designates the toe board of a motor vehicle preferably formed integral at its lower edge with the floor board (not shown). The toe board is provided with an opening 11 to receive the present booster mechanism in a manner to be described. Such opening may be stamped in the floor boards of all automobiles of a given make or model and may be covered by a suitable plate (not shown) if no booster mechanism is to be used.

The present invention comprises a differential fluid pressure operated motor indicated as a whole by the numeral 14. This motor comprises a bellows 15 of generally rectangular shape, as will be apparent from Figure 5. The forward extremity of the bellows is provided with a bead 16 adapted to be arranged between a flange 17, formed on a forward motor wall 18, and a flange 19 forming part of a plate 20 fixed to the toe board as at 21. The flange 19 is offset from the body of the plate 20 a predetermined distance in accordance with individual installations, depending upon the space available forwardly of the toe board. Screws or other fastening elements 22 pass through the flanges 17 and 19, a spacer 23 being arranged between these flanges.

The motor further comprises at the rear thereof a pressure plate 25 and a clamping plate 26 between the edges of which is arranged a bead or flange 27 molded integral with the forward edge of the bellows 15. The bead 27 is secured in position between the plates 25 and 26 by screws 29, along the normally vertical edges of the plates 25 and 26, and by screws 30 through the top portion of the plate 26, the screws 29 and 30 passing through a spacer or spacing frame 31 corresponding in shape to the inside edge of the bead 27. The upper screws 30 also secure against the plate 26 a transverse, relatively narrow plate 32 for a purpose to be described. The lower edges of the plates 25 and 26 are secured together by means to be described.

The plate 25, bellows 15 and plate 18 define within the motor a variable pressure chamber 34 in which atmospheric pressure normally is present to balance the pressure against the outer face of the pressure plate 25. A valve mechanism indicated as a whole by the numeral 35 is arranged within the chamber 34 and is fixed to the wall 25 by any suitable means, for example by screws 36 shown in dotted lines in Figures 5. The valve mechanism comprises a preferably die-cast body 37 having an axial bore 38 therethrough in which is fixed a sleeve 39 the right-hand end of which in Figures 1, 2 and 4 seats within a recess 40 formed by offsetting the plate 25. The sleeve 39 is ported as at 41 for communication with a chamber 42 formed in the valve body 37 and communicating through one or more ports 43 with a chamber 44 formed within an annular air cleaner 45 clamped in position between the plates 25 and 26. Outwardly of the air cleaner 45 is formed a chamber 46 which is in fixed communication with the atmosphere through openings 47 (Figure 6) formed in the clamping plate 26.

Referring to Figures 1, 2, 4 and 5, the valve body 37 is provided with a chamber 50 encircling the sleeve 39 and communicating above the sleeve with a transverse chamber 51 closed by a plate 51'. The chamber 51 extends laterally substantially beyond the bore 38 for communication with one end of a nipple 52, and to the other end of this nipple is connected a flexible hose 53. The other end of the hose 53 is connected to a nipple 54 extending through the motor body member 18 as shown in Figure 5 for connection with a suitable duct leading to the intake manifold of the vehicle engine or other source of vacuum. It will be apparent that the chambers 50 and 51, accordingly, are always subject to vacuum in the normal operation of the motor vehicle.

The sleeve 39 is provided with ports 56 communicating between the interior of the sleeve 39 and the vacuum chamber 50. The opening and closing of the ports 41 and 56 are controlled by a valve indicated as a whole by the numeral 57.

Figure 3:
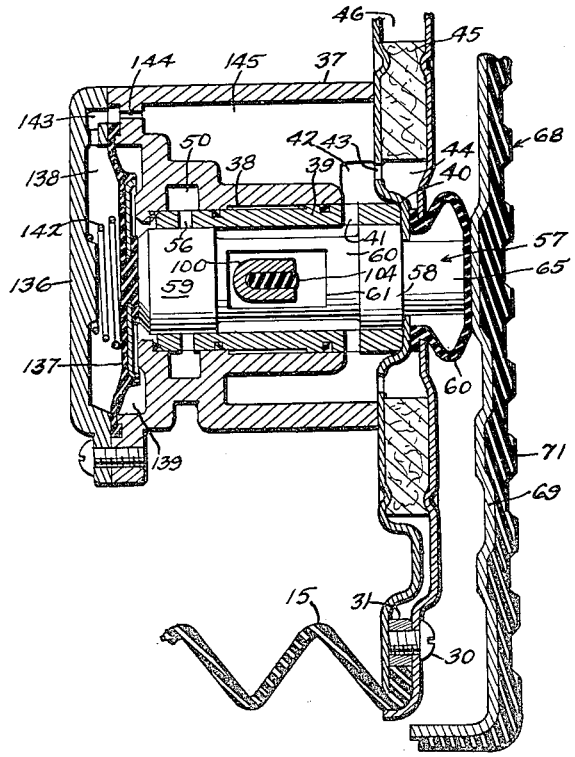
Figure 3 is a fragmentary sectional view on line 3—3 of Figure 1.

The valve 57 is provided with a pair of heads 58 and 59 connected to each other by a reduced shank 60 having intermediate its ends a vertical slot 61 horizontally elongated as clearly shown in Figure 3. The space around the shank 60 is open to the motor chamber 34 through a horizontally elongated opening 62 formed in the sleeve 39. Accordingly, it will be apparent that the space around the shank 60 is always in communication with the motor chamber 34. The head 58 normally opens the ports 41, and the head 59 normally closes the ports 56. Accordingly, atmospheric pressure is present in the motor chamber 34 when the parts are in the inoperative positions shown in Figure 1. When the valve 57 is moved to the left as in Figure 2, the motor chamber 34 is closed to the atmosphere and the vacuum ports 56 are opened to connect the motor chamber 34 to the source of vacuum, thus energizing the motor.

The valve 57 is provided at its right-hand end as viewed in Figures 1–4, inclusive, with an operating stem 65 projecting through the pressure plate 25 and arranged within a sealing boot 66 having its periphery clamped between the plates 25 and 26. Outwardly of the boot 66 is arranged a treadle indicated as a whole by the numeral 68 and comprising a treadle plate 69 suitably covered by a rubber or other cushion surface sheet 71. The treadle is supported for rocking movement in a manner to be described.

When the motor is energized by movement of the valve 57 as referred to above, the plates 25 and 26 turn about a pivot axis to swing toward the toe boards 11. To this end, the plate 25 is provided adjacent the bottom thereof with a hinge member 74, and the motor body member 18 is provided with a similar hinge member 75. These hinge members have portions turned about a pivot pin 76. The hinge member 75 is fixed to the motor casing or body member 18 by bolts 77 which also pass through the bottom portion of the spacer 23 and serve to clamp in position the adjacent edge of the bottom 78 of the bellows 15. Within the motor is arranged a plurality of bellows subtending frames 79, 80, and 81. The frame 79 has its lower end seating on the hinge member 75 while the lower end of the frame 81 seats on the hinge 74. The lower edge portion of the intermediate frame 80 has alternately bent fingers 82 straddling the bottom hinge to form a retaining seat for such frame member.

The hinge member 74 is secured in position by bolts 85 which pass through the hinge member 74, plates 25 and 26, and spacer 31, the heads of the bolts 85 being accessible through openings 86 in the treadle 68.

Below the bottom 78 of the bellows, the clamping plate 26 extends downwardly and rearwardly and then curves downwardly and forwardly to form a semicylindrical retaining member 90 which may extend substantially throughout the width of the plate 26 as shown in Figure 6. The lower end of the treadle plate 69 is turned rearwardly as at 91, and spaced end portions of such rearwardly turned edge are bent to form elongated eyes 92 seating within the retaining member 90. The bolts 85 also retain in position a plate 93 which extends at the end portions thereof vertically downwardly over the eyes 92, as shown in Figures 1 and 4, to retain the eyes 92 in the members 90. Intermediate the eyes 92, the plate 93 is bent inwardly as at 94, and the ends of such portion of the plate 93 engage the eyes 92 at the adjacent ends thereof, thus fixing the treadle plate against movement longitudinally of the pivot means provided by the structure referred to. This pivoting structure is simple and economical to manufacture and capable of easy assembly.

Against the inner face of the plate 25 is secured a pair of vertically elongated brackets 96 (Figures 1 and 5) spot-welded or otherwise secured to the plate 25. These brackets are provided with parallel spaced flanges 97 between which extends a pivot bolt 98 extending through the lower end of a lever 99. At its upper end portion, this lever is bent into substantially U shape, as indicated by the numeral 100 in Figure 3, and the lower end of the lever comprises spaced arms 101 against the outer face of each of which is welded a stiffening bar 102. The brackets 96 therefore pivotally support the lever 99.

The upper end of the lever 99, as shown in Figures 1–4 inclusive, has clamped therein a rubber cushion 104 projecting very slightly beyond the open end of the U formed at the upper extremity of the lever, as will be clear from Figure 3. Such portion of the lever is arranged in the slot 61, and the lever and its cushion 104 are normally maintained spaced from the ends of the slot 61 in a manner to be described.

The sleeve opening 62 (Figures 1, 2 and 4) opens through the bottom of the valve housing 37, and the latter is provided with a wall 105 against which seats the head of a resilient button 106 caried by the lever 99. This button seats against the wall 105 and carries at the opposite side of the lever the projecting integral stem 107 arranged in a compression spring 108 the opposite end of which is arranged in an opening 109 in a depending portion 110 of the valve housing 37. The spring 108 maintains the button 106 against the wall 105, and in the normal position of the parts, the left side of the lever in Figure 1 is slightly spaced from the adjacent end of the slot 61 while the free edge of the cushion 104 is spaced to a greater extent from the right-hand end of the slot 61.

The lever 99, slightly above the pivot pin 98, is connected by a pivot pin 112 to a push rod 113 extending into an axial recess 114 formed in a piston structure 115 extending into a master cylinder 116 having an outlet generally indicated by the numeral 117 and leading through the usual residual presure valve (not shown) and pipe lines to the wheel cylinders of the vehicle. The piston 115 carries a pair of sealed heads 120 and 121 the latter of which, in the off positions of the parts, affords communication between the pressure chamber 122 of the master cylinder, through a port 123, with a chamber 124 to which fluid is supplied from a suitable reservoir (not shown) through a pipe 125. The chamber 124 is in open communication at all times through a port 126 with the chamber 127 formed between the piston heads 120 and 121.

The master cylinder 116 preferably projects into a positioning sleeve 130 which may be welded to the motor casing section 18, and this casing section, the positioning member 130 and the master cylinder are fixed together by bolts 131.

The piston 115 projects from the inner end of the master cylinder and supports a spring seat 133 engaged by one end of a return spring 134. The opposite end portion of this spring surrounds the positioning member 130 and seats thereagainst to urge to normal off positions the parts associated therewith.

The end of the valve housing 37 remote from the pressure plate 25 is provided with a cap 136, and between this cap and the adjacent end of the body 37 is clamped a diaphragm 137 forming with the cap and the valve body a pair of chambers 138 and 139. The chamber 139 communicates with the motor chamber 34 at all times through a pair of ports 140, on opposite sides of a stiffening web 141 (Figure 5), and accordingly the chamber 139 is always subject to pressures within the motor.

Referring to Figure 3, it will be noted that the diaphragm 137 is biased toward the valve 57 by a compression spring 142, and this spring forms the sole means biasing the valve 57 to its normal off position shown in Figures 1 and 3. The chamber 138 communicates with a port 143 (Figure 3) in the cap 136, and this port in turn communicates through a restricted port 144 with an air chamber 145 in the valve body 37. This chamber is arranged to one side of the axis of the valve and communicates at its right-hand end with the chamber 42, and, accordingly, atmospheric pressure is always present in the chamber 145.

Means are provided for limiting movement of the treadle 68 toward the right in Figure 1 under the influence of the spring 142, and for limiting movement of the treadle plate toward the clamping plate 26 under conditions in which full brake application takes place. The top portion of the plate 69 is bent horizontally inwardly toward the plate 26, beyond the upper extremity thereof, as indicated by the numeral 146. As indicated in Figures 6 and 7, each upper corner portion of the treadle plate 69 is also bent inwardly as at 147. This forms a lip engageable with a rubber bumper 148 carried by the back base of the plate 32, previously described. Engagement of these elements limits movement of the treadle plate away from the clamping plate 26. The front or outer face of the plate 32 carries a heavier resilient bumper 149 engageable with the body of the plate 69 to limit movement thereof toward the plate 26.

*Operation*

The parts normally occupy the positions shown in Figure 1. When the brakes are to be applied, the operator will depress the treadle 68 and initial movement of the treadle effects movement of the valve 57 toward the left solely against the tension of the spring 142, there being no contact betwen the valve and the cushion 104. The parts are moved until the valve head 58 closes the port 41, and the valve head 59 cracks the port 56. The parts are shown slightly beyond such positions in Figure 2, a result which would take place upon relatively rapid initial treadle operation.

The movement of the parts referred to disconnects the air chamber 42 from the motor chamber 44 and connects the latter to the source of vacuum through ports 56, chambers 50 and 51, and vacuum pipe 53 (Figure 5), thus exhausting air from the motor chamber 34, and air pressure against the pressure plate 25 will move this plate to the left as suggested in Figure 4, all of the parts connected to the plate 25 similarly partaking of such movement. It will be apparent that initial movement of the plate 25 will be imparted to the lever 99 through the medium of the spring 108, the button 106 accordingly remaining in contact with the wall 105 and the upper end of the lever moving bodily with the valve 55 without engaging any parts thereof. Such operation, in the absence of the diaphragm 137 and associated parts, would cause the operator to have a feeling that the pedal was falling away from his foot, this being due to the fact that the spring 142, engaging the cap 136, moves therewith.

Immediately upon initial motor energization, however, a drop in pressure will occur in the diaphragm chamber 139, and with the chamber 138 open to the atmosphere, differential pressures acting on the diaphragm 137 will add to the tension of the spring 142 in opposing movement of the valve 57. This opposition to movement of the valve will progressively increase by an increase in differential pressures affecting the diaphragm 137 during initial motor energization.

Movement of the lever 99 by the spring 108 effects movement of the master cylinder piston 115, initial movement of such piston closing port 123 and then displacing fluid through the brake lines to engage the brake shoes with the drums. When hydraulic line pressure reaches a predetermined point, for example 80 lbs., the spring 108 no longer will be strong enough to effect movement of the lever 99. Hydraulic reaction forces will then move this lever relatively clockwise about its pivot 98, and the cushion 104 will be brought into engagement with the right-hand end of the slot 61 as shown in Figure 4. A hydraulic reaction from the master cylinder is then transmitted to the valve to oppose movement thereof to a degree proportional to master cylinder pressures. These will be no sudden engagement of the cushion 104 with the valve since this movement takes place somewhat in a progressive manner, and in moving to the position shown in Figure 4, the spring 108 will be progressively compressed, thus smoothing out the interim of operation between the positioning of the parts shown in Figure 2 and the positioning shown in Figure 4.

Thus it will be apparent that initial treadle operation takes place solely against the spring 142 while in the next stage of operation, resistance to movement of the valve is opposed to a progressively increasing extent by the diaphragm 137. In the next stage of operation, the spring 108 will be compressed to add additional resistance to treadle operation, followed by the fourth stage of operation in which the cushion 104 engages the right-hand end of the slot 61 as shown in Figure 4. These stages of operation are smoothly progressive and provide the treadle with a highly desirable "feel".

A point in the operation of the apparatus will be reached wherein the motor will be energized to a maximum extent with full vacuum in the motor chamber 34, this condition being known as "power run-out." This point will occur prior to the maximum possible brake application. Beyond this point, the treadle plate 69 will move the valve 57 from the position shown in Figure 4 to the maximum brake applied position in which the button 106 will engage solidly against the wall 105, whereupon the treadle 68, the plates 25 and 26, valve body 37, and the upper end of the lever 99 will move as a unit. To minimize undue pressure between the button 106 and wall 105, this operation will be carried out with the treadle plate 69 in engagement with the bumper 149 (Figure 7).

It will be apparent that the latter stage of brake application will take place with the transmission of substantial force from the valve 57 to the upper end of the lever 99. The cushion 104 extends only slightly beyond the free ends of the lever sides 100 (Figure 3) and the cushion acts largely as a silencing means in the operation of the device. When heavy pressure is exerted thereagainst, the cushion 104 will be deformed sufficiently to provide for metal-to-metal contact between the edges of the lever portions 100 and the right-hand end of the slot 61.

It will be apparent that any desired differential pressure resistance to movement of the valve may be provided by properly designing the size of the diaphragm 137. Similarly, the proportional hydraulic reaction transmitted through the lever 99 may be determined by proper design of the lever lengths between the axes of the pivots 98 and 112 and the axis of the pivot bolt 98 and the point of contact of the lever with the right-hand end of the slot 61.

When the brakes are to be released, the operator merely will remove his foot from the treadle 68. The spring 142 then returns the valve to the normal position shown in Figure 1, and air will flow through the air cleaner 45, through ports 43, chamber 42, ports 41 and 62 and thus into the motor chamber 34 to balance pressures therein. The biasing spring 134 will return the lever to its normal position, but this spring will be overbalanced by the spring 108 to a sufficient extent to maintain the button 106 in engagement with the wall 105.

The two plates 25 and 26 are simple in construction and provide novel means for clamping the bead 27 of the bellows 15 in position, and they also serve to support in position the air cleaner 45. The novel means for connecting the treadle to the pressure plate 26 is simple and easily assembled and eliminates the necessity for using a pivot pin to connect these members to each other. The apparatus, accordingly, has been found to be economical to manufacture and assemble and provides an extremely smooth operation under all conditions. Any tendency for the valve 57 to chatter, and such a tendency is substantially negligible, has been eliminated by providing the restricted port 144 (Figure 3) which slows down the admission and escape of air to and from the chamber 138, thus providing in effect somewhat of a cushioning or snubbing action for the valve.

It is to be understood that the form of the invention shown and described is for the purpose of illustration, the invention being defined in the appended claims.

I claim:

1. A booster brake mechanism for a motor vehicle comprising a master cylinder, a piston therein, a fluid motor having a wall fixed with respect to said master cylinder, a movable pressure wall, a flexible casing connected between said walls, a lever having a first pivot adjacent one end pivotally connecting it to said movable wall, a second pivot spaced from said first pivot and connecting said piston to said lever, a valve mechanism comprising a casing carried by said movable wall and into which the other end of said lever projects, a valve in said valve casing having a normal position connecting the interior of said motor to the atmosphere and being movable for connecting the interior of said motor to a source of sub-atmospheric pressure, said other end of said lever having a normal position in which a portion thereof is spaced from a portion of said valve to be engaged by the latter when hydraulic pressure in said master cylinder swings said lever about said first pivot, spring means biasing said other end of said lever to said normal position, and means subject to the degree of sub-atmospheric pressure in the interior of said motor for opposing movement of said valve from its normal position.

2. A booster brake mechanism according to claim 1 wherein the means for opposing said movement of said valve comprises a diaphragm having one side subject to atmospheric pressure and its other side subject to pressures in the interior of said motor.

3. A booster brake mechanism comprising a master cylinder, a piston slidable thereinto, a motor comprising a wall fixed with respect to said master cylinder, a movable wall having its outer face subject to atmospheric pressure, a flexible casing connected between said walls and defining therewith a motor chamber, a valve housing carried by said movable wall in said motor chamber, a lever, a first pivot connecting said lever to said movable wall, the other end of said lever projecting into said valve housing, a second pivot carried by and movable with said lever and arranged relatively close to said first pivot, said piston being connected to said second pivot, a valve in said valve housing having a normal position connecting said motor chamber to the atmosphere and being movable in one direction from such position to disconnect said motor chamber from the atmosphere and connect it to a source of subatmospheric pressure, said other end of said lever having a portion engageable with said valve housing to limit its movement away from said movable wall to a normal position in which another portion of said other end of said lever is in spaced relation to a portion of said valve in said direction of movement thereof, a spring engaging said lever to bias it to its normal position and against which said lever is movable under the influence of master cylinder pressures to move said other portion of said lever into engagement with said portion of said valve to oppose movement of the latter in said direction, and a pressure responsive device responsive to sub-atmospheric pressure in said motor chamber for opposing movement of said valve in said direction independently of said lever.

4. A booster brake mechanism according to claim 3 wherein said pressure responsive device comprises a diaphragm carried by said valve housing, said valve housing providing on opposite sides of said diaphragm a pair of chambers one of which communicates with the atmosphere and the other of which communicates with said motor chamber.

5. A booster brake mechanism according to claim 3 wherein said valve is provided with a longitudinally elongated slot in which said other end of said lever is arranged, said other portion of said lever which engages said portion of said valve comprising a resilient bumper in said slot engageable against one end thereof.

6. A booster brake mechanism comprising a master cylinder, a fluid motor comprising a wall fixed with respect to said master cylinder and a movable wall having an outer face exposed to atmospheric pressure, a flexible casing connecting said walls and defining therewith a motor chamber, a valve housing carried by said movable wall in said chamber and having an axis spaced substantially from the axis of said master cylinder, said valve housing at the side thereof adjacent the axis of said master cylinder having a radial opening therethrough, a valve axially slidable in said valve housing, said valve having a normal position connecting said motor chamber to the atmosphere and being movable in one direction from such position to disconnect said motor chamber from the atmosphere and connect it to a source of sub-atmospheric pressure, said valve having an axially elongated slot registering with said opening in said valve housing, a lever, a first pivot connecting said lever to said movable wall, a second pivot relatively close to said first pivot, said second pivot being movable with said lever and connected to said piston, the other end of said lever projecting through the opening in said valve housing and into said slot and having a normal position spaced from one end of said slot for the free movement of said valve from said normal position through a predetermined distance of movement, means biasing said lever to said normal position, and pressure operable means responsive to differences in pressure between said motor chamber and the atmosphere for opposing movement of said valve from said normal position.

7. A booster brake mechanism according to claim 6 wherein said pressure operable means comprises a diaphragm, said valve housing having portions forming with said diaphragm a pair of pressure chambers one of which, adjacent said valve, communicates with said motor chamber and the other of which communicates with the atmosphere, and a spring in said other chamber biasing said diaphragm into engagement with said valve and forming the sole means opposing movement of said valve initially away from its normal position.

8. A booster brake mechanism according to claim 6 wherein said movable wall comprises a pair of plates fixed to each other and provided with a space therebetween around the axis of said valve housing, an annular air cleaner in said space having its radially outer surface open to the atmosphere, said valve housing having an air chamber communicating with said space radially inwardly of said air cleaner.

9. A booster brake mechanism for a motor vehicle comprising a master cylinder, a piston therein, a fluid pressure motor having a stationary wall to which said master cylinder is fixed adjacent the bottom thereof, a movable pressure wall pivotally connected adjacent its lower end to said stationary wall, a bellows connected between said walls and forming therewith a motor chamber, a lever having a first pivot at its lower end connecting it to said movable wall, a second pivot carried by said lever above said pivot and connected to said piston, a valve housing carried by said movable wall adjacent the upper end thereof within said motor chamber, the upper end of said lever projecting into said valve housing, a valve in said valve housing having a normal position connecting said chamber to the atmosphere and movable from such position to disconnect said chamber from the atmosphere and connect it to a source of sub-atmospheric pressure, said valve having an elongated slot in which the upper end of said lever is arranged, said lever being biased to a normal position spaced from one end of said slot for free movement of said valve from its normal position, means biasing said valve to its normal position, and means subject to the degree of subatmospheric pressure in said motor chamber for opposing said movement of said valve.

10. A booster brake mechanism according to claim 9 wherein said means for opposing said movement of said valve comprises a diaphragm engaging said valve and having one side subject to atmospheric pressure and its other side subject to pressures in said motor chamber.

11. A booster brake mechanism according to claim 9 wherein said means for opposing said movement of said valve comprises a diaphragm engaging said valve and having one side subject to atmospheric pressure and its other side subject to pressures in said motor chamber, said means for biasing said valve to its normal position comprising a spring engaging said diaphragm.

12. A booster brake mechanism according to claim 9 provided with an operating stem carried by said valve and projecting through said pressure wall, and a treadle overlying said pressure wall and pivoted relative thereto at its lower edge, said stem engaging said treadle and normally holding it in a position spaced from said pressure wall for movement independently of the latter to actuate said valve.

13. A booster brake mechanism according to claim 9 wherein said lever is provided with a resilient button engaging a portion of said valve casing to limit movement of said lever to its normal position.

14. A booster brake mechanism for a motor vehicle comprising a master cylinder, a piston therein, a fluid motor having a stationary wall to which said master cylinder is fixed adjacent the bottom thereof, a movable pressure wall pivoted at its lower end to said stationary wall, a bellows connected between said walls and forming therewith a motor chamber, a lever having a first pivot adjacent its lower end connecting it to said movable wall, a second pivot carried by said lever and spaced from said first pivot and to which said piston is connected, a valve housing carried by said movable wall adjacent the upper end thereof and arranged in said motor chamber, a valve axially movable in said valve housing and having a normal position connecting said motor chamber to the atmosphere and movable in one direction from such position to disconnect said chamber from the atmosphere and connect it to a source of subatmospheric pressure, said valve having a longitudinally elongated slot into which the upper end of said lever projects, said lever being biased in said direction to a normal position away from one end of said slot and spaced therefrom for free movement of said valve from its normal position, said valve housing having a wall engageable with the upper end of said lever to limit its movement in said direction to said normal position, a spring biasing said valve to its normal position, and a pressure responsive device subject to pressures in said motor chamber for opposing movement of said valve in said direction to a degree proportional to the degree of sub-atmospheric pressure in said motor chamber.

15. A booster brake mechanism according to claim 14 wherein said pressure responsive device comprises a diaphragm forming with said valve housing a chamber communicating with said motor chamber, and a cap covering said diaphragm and forming therewith a chamber communicating with the atmosphere, said diaphragm engaging said valve and said spring engaging said diaphragm.

16. A booster brake mechanism according to claim 14 provided with a resilient button carried by said lever and engaging said wall of said valve housing, said button having a stem projecting through and beyond said lever, and a compression spring surrounding said stem and having its opposite end stationary relative to said movable wall to urge said lever to its normal position.

17. A booster brake mechanism according to claim 14 provided with a clamping plate fixed to said pressure wall and having a portion spaced therefrom, an air cleaner arranged between and held in position by said pressure wall and said clamping plate, there being a space within said air cleaner from which air is supplied to said valve and there being a space outwardly of said air cleaner communicating with the atmosphere.

18. A booster brake mechanism according to claim 14 provided with a clamping plate fixed to said pressure wall and having a portion spaced therefrom, an air cleaner arranged between and held in position by said pressure wall and said clamping plate, there being a space within said air cleaner from which air is supplied to said valve and there being a space outwardly of said air cleaner communicating with the atmosphere, said valve having a stem projecting through said pressure wall and said clamping plate, and a treadle pivoted at its lower end relative to said clamping plate and engaging said stem, said treadle being normally spaced from said clamping plate and being movable relative thereto to actuate said valve.

References Cited in the file of this patent

UNITED STATES PATENTS 2,207,700   Porter _____ July 16, 1940